United States Patent [19]

Ishikawa et al.

[11] Patent Number: 5,375,856
[45] Date of Patent: Dec. 27, 1994

[54] PROTECTING MEMBER FOR A GASKET

[75] Inventors: Itsuo Ishikawa, Tokyo; Tsunekazu Udagawa, Ichikawa; Hisashi Yasui; Susumu Inamura, both of Tokyo, all of Japan

[73] Assignee: Ishikawa Gasket Co., Ltd., Tokyo, Japan

[21] Appl. No.: 5,359

[22] Filed: Jan. 19, 1993

[30] Foreign Application Priority Data

Jan. 22, 1992 [JP] Japan .................. 4-001805[U]
Jan. 22, 1992 [JP] Japan .................. 4-001809[U]

[51] Int. Cl.⁵ .......................................... F16J 15/06
[52] U.S. Cl. ............................ 277/180; 277/235 B
[58] Field of Search ............... 277/180, 235 B, 236

[56] References Cited

U.S. PATENT DOCUMENTS

| | | | |
|---|---|---|---|
| 1,851,948 | 3/1932 | Summers | 277/235 B X |
| 4,348,032 | 9/1982 | Hanson et al. | 277/235 B |
| 4,971,338 | 11/1990 | Udagawa | 277/235 B |
| 5,054,793 | 10/1991 | Hauenstein et al. | 277/235 B X |
| 5,232,229 | 8/1993 | Udagawa | 277/235 B |

FOREIGN PATENT DOCUMENTS

| | | |
|---|---|---|
| 0338537 | 10/1989 | European Pat. Off. |
| 0440247 | 8/1991 | European Pat. Off. |
| 3842351 | 6/1990 | Germany |
| 121259 | 7/1984 | Japan .................. 277/235 B |
| 293362 | 7/1965 | Netherlands ......... 277/235 B |

*Primary Examiner*—Daniel G. DePumpo
*Attorney, Agent, or Firm*—Kanesaka & Takeuchi

[57] ABSTRACT

A protecting member of the invention is used for a gasket situated between two engine parts. The protecting member includes a spring member situated between the two engine parts and located around bolt. When the bolt is tightened, the spring member abuts against the engine parts and is compressed to provide predetermined pressure to the bolt through the engine parts. Thus, when an outward force applied to the bolt increase, an amount of the outward force exceeding the predetermined pressure, i.e. the tightening pressure, is only applied to the bolt to absorb a part of the outward force. When an inward force applied to the bolt decreases, the predetermined pressure of the spring member acts against the inward force applied to the bolt. Thus, the pressure changes to the gasket is reduced to prevent creep relaxation of sealing means of the gasket.

12 Claims, 2 Drawing Sheets

PROTECTING MEMBER FOR A GASKET

BACKGROUND OF THE INVENTION AND RELATED ART STATEMENT

The present invention relates to a protecting member for a gasket installed in an internal combustion engine, which can prevent creep relaxation of the gasket caused by repeated changes or alterations of forces applied to the gasket through bolts for connecting the engine parts.

As shown in FIG. 1, in the conventional internal combustion engine, when a cylinder head CH is attached to a cylinder block CB, a gasket G is installed between the cylinder head CH and the cylinder block CB, and is securely held therebetween by bolts BO. In case the engine is actuated, when a fuel is combusted in a cylinder bore Hc, large force F is applied to the cylinder head CH, and when the combusted gas in the cylinder bore Hc is exhausted, the pressure applied to the cylinder head CH is released.

Thus, when the force F due to combustion of the fuel in the cylinder bore Hc is applied to the cylinder head CH, tension T1 is applied to the bolts BO through the cylinder head CH, so that tightening pressure applied to the gasket G is temporarily reduced. On the other hand, in the exhaust cycle of the engine, since the tension T1 is suddenly released, tension applied to the bolts BO returns to tension T2 equal to the tightening pressure to the bolts BO, by which the tightening pressure to the gasket G increases again.

As explained above, when the engine is actuated, tension applied to the bolts BO changes repeatedly, by which tightening pressure applied to the gasket G changes as well. The changes of the tightening pressure or tension to the bolts BO cause creep relaxation of the gasket G. Especially, in case the gasket includes beads for sealing around holes, the beads may be damaged by the changes of the tightening pressure.

In case the cylinder head CH is made of an aluminum alloy, thermal expansion and conductive rates are different from those of the bolts BO. Thus, when the engine is started, the cylinder head becomes hot and expands at first, and then the bolts BO become hot. Accordingly, after the cylinder head CH expands and before the bolts BO expand by heat, tightening pressure to the gasket G becomes high, which exceeds the initial tightening pressure applied to the bolts BO. Also, when the engine is stopped and is cooled, the tightening pressure decreases.

Therefore, in a cold area where the difference between the driving temperature and the ambient temperature is great, the change of the tightening pressure by the bolts BO is large, and causes creep relaxation of the gasket.

The kind and degree of the creep relaxation of the gasket or bead depend on the quality of the material that the gasket is made. In case the gasket is formed of a spring steel plate, creep relaxation of the bead does not occur so easily. However, in case the changes of the pressure applied to the gasket are large, the spring ability or resiliency of the bead decreases gradually, and the bead does not function as installed at first to thereby cause leakage of fluid through the bead.

Accordingly, one object of the invention is to provide a protecting member for a gasket, which can effectively prevent creep relaxation of the gasket.

Another object of the invention is to provide a protecting member for a gasket as stated above, which can reduce changes of tension applied to bolts regardless the condition of the engine.

A further object of the invention is to provide a protecting member for a gasket as stated above, which can be formed as a part of the gasket.

A still further object of the invention is to provide a protecting member for a gasket as stated above, which can be manufactured easily and economically.

Further objects and advantages of the invention will be apparent from the following description of the invention.

SUMMARY OF THE INVENTION

A protecting member for a gasket in accordance with the invention is designed to protect a gasket used for an internal combustion engine with two engine parts, especially a cylinder head gasket. The engine parts include bolt holes and are tightened by bolts.

The protecting member is formed of a spring member situated between the two engine parts and located around the bolt. When the bolt is tightened, the spring member abuts against the engine parts and is compressed to provide predetermined pressure to the bolt through the engine parts.

Thus, when an outward force applied to the bolt through the engine part increases, an amount of the outward force exceeding the predetermined pressure is only applied to the bolt to thereby absorb a part of the outward force. On the other hand, when an inward force applied to the bolt through the engine part decreases, the predetermined pressure of the spring member acts against the inward force applied to the bolt. Thus, the spring member reduces pressure changes to the gasket situated between the two engine parts.

In particular, in case the cylinder head is made of an aluminum alloy, thermal expansion and conductive rates are different from those of the bolts. Thus, when the engine is started, the cylinder head becomes hot and expands at first, and then the bolts become hot. Accordingly, after the cylinder head expands and before the bolts expand by heat, tightening pressure to the gasket becomes high, which exceeds the initial tightening pressure applied to the bolts. Also, when the engine is stopped and is cooled, the tightening pressure decreases.

Further, when the engine is actuated, the engine has a combustion cycle and an exhaust cycle. In the combustion cycle, the cylinder head is pushed outwardly to thereby reduce tightening pressure applied to the gasket. In the exhaust cycle, the tightening pressure against the gasket increases again.

In the present invention, since the bolt receives the predetermined tension by the spring member, the spring member absorbs force applied to the gasket through the bolt. Thus, creep relaxation of the gasket is improved.

Especially, in case the gasket includes sealing means around a hole, the spring member protects creep relaxation of the sealing means. Also, in case the gasket has a coating, flow of the coating is reduced.

The protecting member may further include at least one seat member situated between the spring member and the engine part. The seat member protects the engine part from the spring member. The engine part may have a concave or depression around the bolt hole to receive the spring member therein. The seat member may also be situated in the concave.

The spring member may be in a form of a coil, a dish or a bead. In case the spring member is the dish spring or the bead, the spring member may have a ring shape situated around the bolt hole. The dish spring or the bead may be combined with the gasket as one unit. In case the bead is used as the spring member, the bead may be formed in one of plates for the gasket.

DETAILED DESCRIPTION OF PREFERRED EMBODIMENTS

Figure 1:
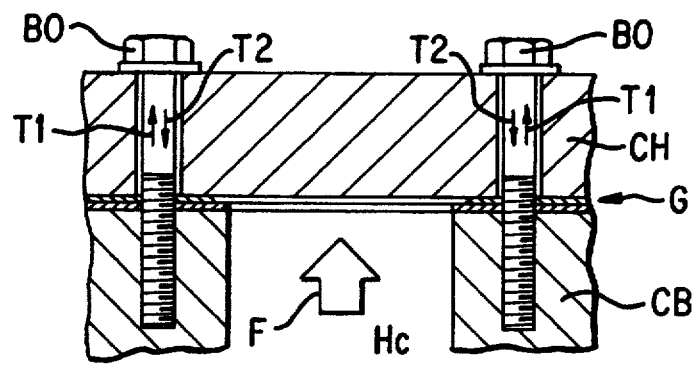
FIG. 1 is an explanatory section view of a conventional engine.
Figure 2:
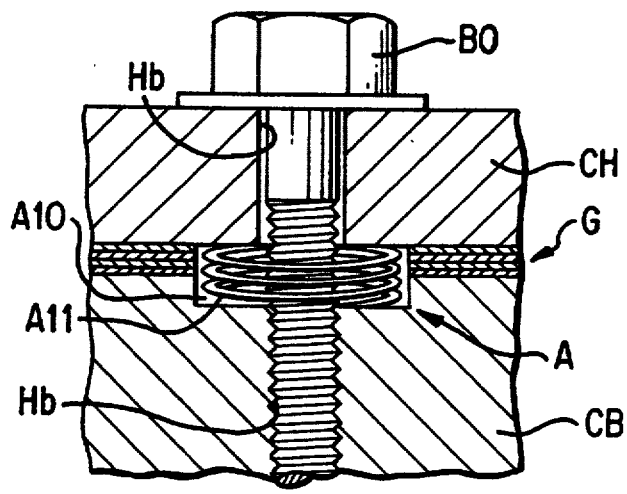
FIG. 2 is an explanatory section view of an engine for showing a first embodiment of a protecting member for a gasket of the invention.

Referring to FIG. 2, a first. embodiment A of the protecting member of the invention is shown. An engine that the protecting member A is installed includes a cylinder head CH with a bolt hole Hb, and a cylinder block CB with a bolt hole Hb. A gasket G is situated between the cylinder head CH and the cylinder block CB.

The cylinder block CB includes a depression A10 around the bolt hole Hb, in which the protecting member A is situated. The protecting member A is a coil spring A11 and is situated around a bolt BO. When the bolt BO is tightened, the cylinder head CH and the cylinder block CB are tightly connected together, and the coil spring A11 is strongly compressed.

In this condition, the upper and lower ends of the coil spring A11 abut against the cylinder head CH and the cylinder block CB, so that the spring A11 urges the cylinder head CH and the cylinder block CB in a direction away from each other. This force is applied to the bolt BO through the cylinder head CH and the cylinder block CB. Thus, a predetermined amount of tension by the compressed spring A11 is applied to the bolt BO in addition to the tightening pressure.

When the cylinder head CH is pushed upwardly upon combustion of fuel in the cylinder bore Hc, the upward force in excess of the predetermined tension applied to the compressed spring A11 is generally applied to the bolt BO. Thus, the cylinder head CH does not receive so strong force by the combustion of the fuel, so that the surface pressure applied to the gasket G does not decrease so much.

When the upward force due to combustion of the fuel is released in the exhaust cycle, inward force due to tightening pressure to the bolt BO is applied only to the bolt BO. Since the upward force to the bolt is suddenly released, the inward force is greater than the tightening pressure to the bolt BO. However, since the cylinder head CH receives the predetermined tension from the spring A11, a part of the large inward force is absorbed by the spring A11, so that the surface pressure applied to the gasket G does not increase so much at the exhaust cycle.

The moderate and constant pressure is generally applied to the gasket G regardless the cycles of the engine.

Further, in case the cylinder head CH is made of an aluminum alloy and the blots BO are made of iron, thermal expansion and conductive rates are different from each other. Thus, when the engine is started, the cylinder head CH becomes hot and expands at first, and then the bolts BO become hot. Accordingly, after the cylinder head CH expands and before the bolts BO expand by heat, the tightening pressure to the gasket becomes high, which exceeds the initial tightening pressure applied to the bolts BO. Also, when the engine is stopped and is cooled, the tightening pressure decreases. The present invention absorbs the excess tightening pressure.

In the gasket, a plurality of sealing means is formed around cylinder bores Hc and other holes, such as water holes and oil holes. If the surface pressure applied to the gasket changes repeatedly, creep relaxation occurs to the sealing means. However, in the present invention, surface pressure on the gasket G does not change so much. Thus, creep relaxation of the sealing means is effectively reduced.

Figure 3:
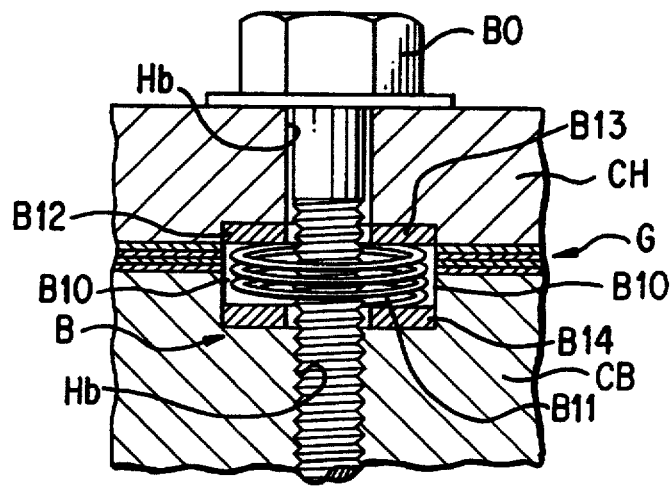
FIG. 3 is an explanatory section view, similar to FIG. 2, for showing a second embodiment of the protecting member.

FIG. 3 shows a second embodiment B of the protecting member of the invention. In this embodiment, the cylinder head CH includes a depression B12, while the cylinder block CB includes a depression B10. A seat member B13 is situated in the depression B12, while a seat member B14 is situated in the depression B10. The seat members B13, B14 are made of hard materials.

In case the cylinder head CH and the cylinder block CB are made of soft metals, such as an aluminum alloy, when a spring B11 is compressed, the cylinder head CH and the cylinder block CB may be damaged by the spring B11. Thus, the seat members B13, B14 made of the hard materials are installed in the cylinder head CH and the cylinder block CB. Accordingly, the cylinder head CH and the cylinder block CB are protected from the spring B11. The protecting member B operates as in the protecting member A.

Figure 4:
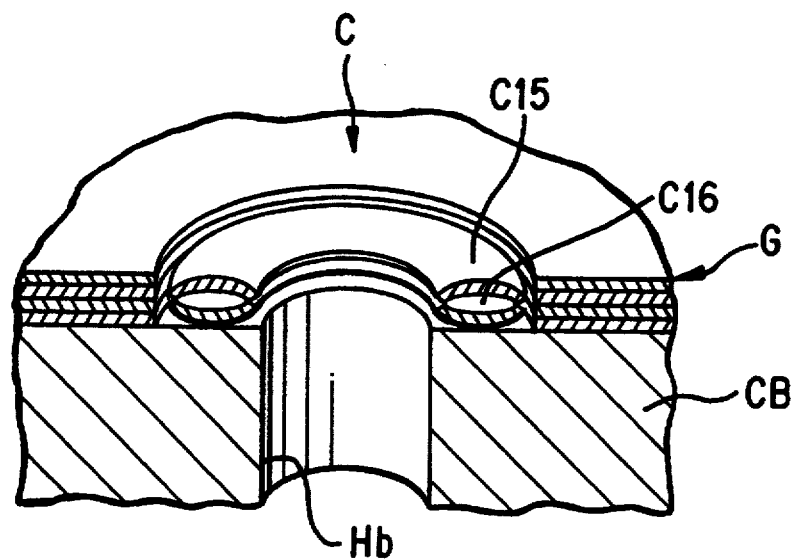
FIG. 4 is an explanatory section view for showing a third embodiment of the protecting member.

FIG. 4 shows a third embodiment C of the protecting member of the present invention. The protecting member C is formed of two curved ring plates C15, C16 with resiliency. The center portions orient outwardly, while the inner and outer edges of the plates C15, C16 abut against each other.

In the protecting member C, the ring plates C15, C16 provide high spring forces when slightly compressed. The protecting member C is useful for providing strong tension to the bolt BO. The protecting member C operates as in the protecting member A.

Figure 5:
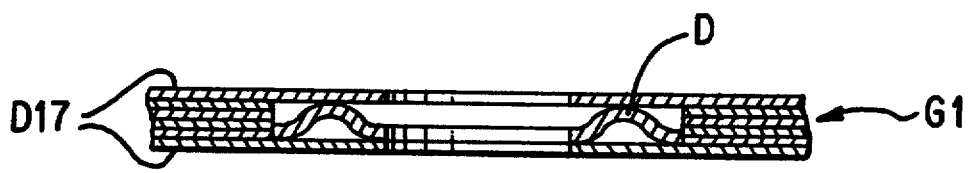
FIG. 5 is a section view for showing a fourth embodiment of the protecting member, which is combined with a metal laminate gasket.

FIG. 5 shows a fourth embodiment D of the protecting member of the invention, wherein the protecting member D is combined with a gasket G1. In FIG. 5, a compressed condition of the protecting member D is shown.

In particular, the protecting member D has a ring shape with a bead, and is situated in a large hole of a gasket G1. Outer plates D17 are situated to cover the protecting member D. In this embodiment, the protecting member D is combined with and located inside the gasket. Thus, it is easy to assemble the protecting member to the engine.

Figure 6:
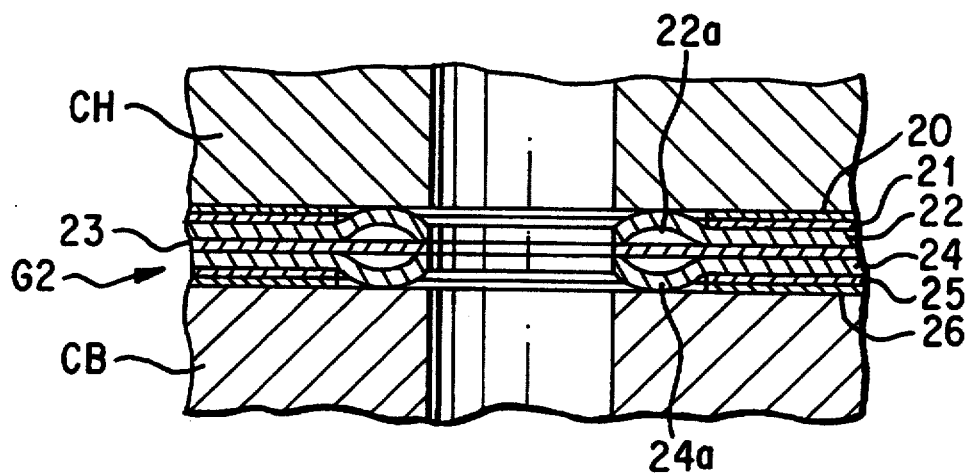
FIG. 6 is a section view for showing a fifth embodiment of the protecting member, which is integrally formed with a metal laminate gasket as one unit.

FIG. 6 shows an embodiment where protecting members are integrally formed with a gasket G2 and is compressed between the cylinder head CH and the cylinder block CB. The gasket G2 is formed of seven plates 20-26, wherein the plate 22 includes a bead 22a, and the plate 24 includes a bead 24a. The beads 22a, 24a constitute the protecting members. When the gasket G2 is not compressed, the beads 22a, 24a extend beyond the outer surfaces of the plates 20, 26.

When the gasket G2 is compressed, as shown in FIG. 6, the beads 22a, 24a are compressed to provide tension to the bolt through the cylinder head CH and the cylinder block CB. Thus, the beads 22a, 24a operate as the protecting members for the gasket.

In the present invention, the protecting member provides to the bolt a pressure opposite to the tightening pressure of the bolt. Thus, the gasket is held between the cylinder head and the cylinder block by the tightening pressure and the counter force by the protecting member. Therefore, even if external force is applied to the cylinder head by combustion of the engine, such force is properly absorbed by the counter force of the protecting member. Consequently, the surface pressure applied to the gasket does not change so much. Thus, creep relaxation of the gasket, such as sealing means and coatings of the gasket, is reduced.

The protecting member of the invention may be used for all the bolts. However, the protecting member may be partly used in the engine. Namely, when the cylinder head is fixed to the cylinder block, a center portion of the cylinder head may be slightly pushed upward by sealing means around the cylinder bores. In this case, if the protecting members are attached to the longitudinal ends of the cylinder head, the longitudinal ends are not extremely compressed, so that the deformation of the cylinder head may be improved.

While the invention has been explained with reference to the specific embodiments of the invention, the explanation is illustrative, and the invention is limited only by the appended claims.

What is claimed is:

1. A protecting member for a gasket situated between two engine parts, said gasket having sealing means around a hole to be sealed and said engine parts having bolt holes and being tightened by bolts, comprising:

a spring member situated between the two engine parts around at least one of the bolts for preventing creep relaxation of the sealing means, when the at least one bolt is tightened said spring member being compressed to provide predetermined pressure to the at least one bolt through the engine parts, so that when an outward force applied to the at least one bolt increases only the amount of the outward force exceeding said predetermined pressure is applied to the at least one bolt, and when an inward force applied to the at least one bolt decreases, said predetermined pressure of the spring member acts against the inward force applied to the bolt to thereby reduce pressure changes to the gasket situated between the two engine parts, and at least one seat member situated between the spring member and one of the engine parts to prevent deformation of the engine part by the spring member.

2. A protecting member for a gasket according to claim 1, wherein said spring member is formed of at least one bead surrounding the bolt hole, the thickness of the spring member being substantially the same as that of the gasket.

3. A protecting member for a gasket according to claim 2, wherein said spring member is in a form of a ring with the bead.

4. A protecting member for a gasket according to claim 2, further comprising a gasket extending substantially throughout an entire area of the engine parts and having at least one bolt hole, said gasket being formed of a plurality of metal plates to constitute a metal laminate gasket, said bead for the spring member being formed around the bolt hole of the gasket.

5. A protecting member for a gasket according to claim 4, wherein said bead for the spring member is in a form of a ring and is located on one of the metal plates.

6. A protecting member for a gasket situated between two engine parts, said gasket having sealing means around a hole to be sealed and said engine parts having bolt holes and being tightened by bolts, comprising:

a coil spring situated between the two engine parts around at least one of the bolts for preventing creep relaxation of the sealing means, said coil spring having upper and lower ends abutting against the engine parts, when the at least one bolt is tightened said coil spring abutting against the engine parts and being compressed to provide predetermined pressure to the at least one bolt through the engine parts, so that when an outward force applied to the at least one bolt increases only the amount of the outward force exceeding said predetermined pressure is applied to the at least one bolt, and when an inward force applied to the at least one bolt decreases, said predetermined pressure of the coil spring acts against the inward force applied to the at least one bolt to thereby reduce pressure changes to the gasket situated between the two engine parts.

7. A protecting member for a gasket according to claim 6, wherein said at least one of the engine parts includes a depression around the bolt hole to receive a part of the coil spring therein.

8. A protecting member for a gasket situated between two engine parts, said engine parts having bolt holes and being tightened by bolts, comprising:

a spring member situated between the two engine parts around at least one. Of the bolts, said spring member being formed of two resilient curved ring plates piled together, when the at least one bolt is tightened said spring member abutting against the engine parts and being compressed to provide predetermined pressure to the at least one bolt through the engine parts, so that when an outward force applied to the at least one bolt increases only the amount of the outward force exceeding said predetermined pressure is applied to the at least one bolt, and when an inward force applied to the at least one bolt decreases, said predetermined pressure of the spring member acts against the inward force applied to the at least one bolt to thereby reduce pressure changes to the gasket situated between the two engine parts.

9. A protecting member for a gasket according to claim 8, wherein said gasket includes sealing means around a hole to be sealed, said spring member preventing creep relaxation of the sealing means.

10. A protecting member for a gasket according to claim 8, wherein each resilient curved ring plate includes inner and outer edges, and a center portion between the inner and outer edges, said center portion protruding outwardly to provide resiliency.

11. A protecting member for a gasket according to claim 10, wherein said inner and outer edges of the two ring plates abut against each other to allow the center portions to orient outwardly.

12. A combination of a gasket and a protecting member for the gasket situated between two engine parts, said engine parts having bolt holes and being tightened by bolts, comprising:

said gasket extending substantially throughout an entire area of the engine parts and including at least one bolt hole, at least one hole to be sealed, and sealing means situated around the hole for sealing therearound, said gasket being formed of a center plate having a first hole corresponding to the at least one bolt hole, two intermediate plates situated on both outer surfaces of the center plate and having second holes corresponding to the at least one bolt hole, and two outer plates situated outside the respective intermediate plates and having third holes larger than the second holes, and said protecting member being formed of two beads integrally formed in the respective intermediate plates around the second holes, said beads being situated inside the third holes of the outer plates and projecting toward the engine parts through the third holes, said beads abutting against the engine parts when at least one of the bolts extending through said at least one bolt hole is tightened and being compressed to provide predetermined pressure to the at least one bolt through the engine parts so that when an outward force applied to the at least one bolt increases only the amount of the outward force exceeding said predetermined pressure is applied to the at least one bolt, and when an inward force applied to the at least one bolt decreases, said predetermined pressure of the beads acts against the inward force applied to the at least one bolt to reduce pressure changes for the gasket and to prevent creep relaxation of the sealing means.

* * * * *

UNITED STATES PATENT AND TRADEMARK OFFICE
CERTIFICATE OF CORRECTION

PATENT NO. : 5,375,856
DATED : December 27, 1994
INVENTOR(S) : Itsuo Ishikawa et al It is certified that error appears in the above-indentified patent and that said Letters Patent is hereby corrected as shown below:

Col. 5, claim 1, line 17, before "bolt" add --at least one--.

Col. 6, claim 8, line 5, change "one. Of" to --one of--

Signed and Sealed this

Fourteenth Day of March, 1995

*Attest:*

BRUCE LEHMAN

*Attesting Officer*     *Commissioner of Patents and Trademarks*